United States Patent

[11] 3,602,811

[72] Inventor Douglas I. Fales
 Flint, Mich.
[21] Appl. No. 842,471
[22] Filed July 17, 1969
[45] Patented Aug. 31, 1971
[73] Assignee General Motors Corporation
 Detroit, Mich.

[54] ELECTRICAL MEASURING DEVICE
 5 Claims, 5 Drawing Figs.
[52] U.S. Cl. .................................................. 324/78 I,
 324/169, 324/132, 324/126, 324/157
[51] Int. Cl. ...................................................... G01p 3/48
[50] Field of Search ......................................... 324/70, 78,
 140, 132, 157, 126, 105

[56] References Cited
 UNITED STATES PATENTS
 3,323,058  5/1967  Anthon ........................ 324/132

Primary Examiner—Michael J. Lynch
Attorneys—Jean L. Carpenter and Paul Fitzpatrick

ABSTRACT: An electrical measuring device for measuring the rate of occurrence of an event or the magnitude of some quantity at a remote point having two coil windings, the currents through which are controlled in a manner such that the current through the first coil winding decreases with an increase in the magnitude of the condition being measured, and the current through the second coil winding increases with a decrease in the current through the first coil winding, and a compensation network to provide for maximum accuracy in a relatively inexpensive mechanism.

PATENTED AUG 31 1971 3,602,811

INVENTOR.
Douglas I. Fales
BY
Paul Fitzpatrick
ATTORNEY

ELECTRICAL MEASURING DEVICE

This invention relates to an electrical measuring device for measuring a condition which may be the rate of occurrence of an event or the magnitude of some quantity at a remote point and more particularly to a device including two coil windings through which currents are controlled to produce magnetic fields having a resultant angular orientation which varies correspondingly to the magnitude of the condition being measured, a magnetic armature to align with the resultant magnetic field, and means for obtaining maximum accuracy from an inexpensive coil winding and armature assembly including temperature and indicator error compensation.

A number of electric meters have been proposed to measure conditions which may be the rate of occurrence of an event or the magnitude of some quantity at a remote point. In order for these meters to obtain a high accuracy indication, delicate D'Arsonval movements utilizing precision jewel bearings are utilized. As a result, these meters are delicate and relatively expensive.

The general object of this invention is to provide an electrical measuring device for measuring conditions including the rate of occurrence of an event such as rotation of a distributor rotor, vehicle wheels or other reoccurring events, or the magnitude of some quantity at a remote point such as fuel level, temperature or other conditions.

More specifically, it is an object of this invention to provide an electrical measuring device which is rugged and inexpensive, has a high torque output, and which has a high degree of accuracy.

These objects are accomplished by utilizing an air core gauge having two coil windings and a magnetic armature to drive an indicator. Currents through the coil windings are controlled in a manner to produce a rotating magnetic field to which the magnetic armature aligns. The coil winding and armature assemblies are relatively inexpensive and have within them known nonlinearities. To eliminate these nonlinearities so as to provide for high accuracy indications, an indicator error compensation network in the form of a feedback circuit is utilized. In addition to making possible high accuracy indications, the compensation network provides the capability of an increased torque output of the electrical measuring device. To further enhance the accuracy, temperature compensation is provided to compensate for drifts resulting from temperature changes. The invention may be best understood by reference to the following detailed description of preferred embodiments when considered in conjunction with the accompanying drawing, in which:

Figure 1:
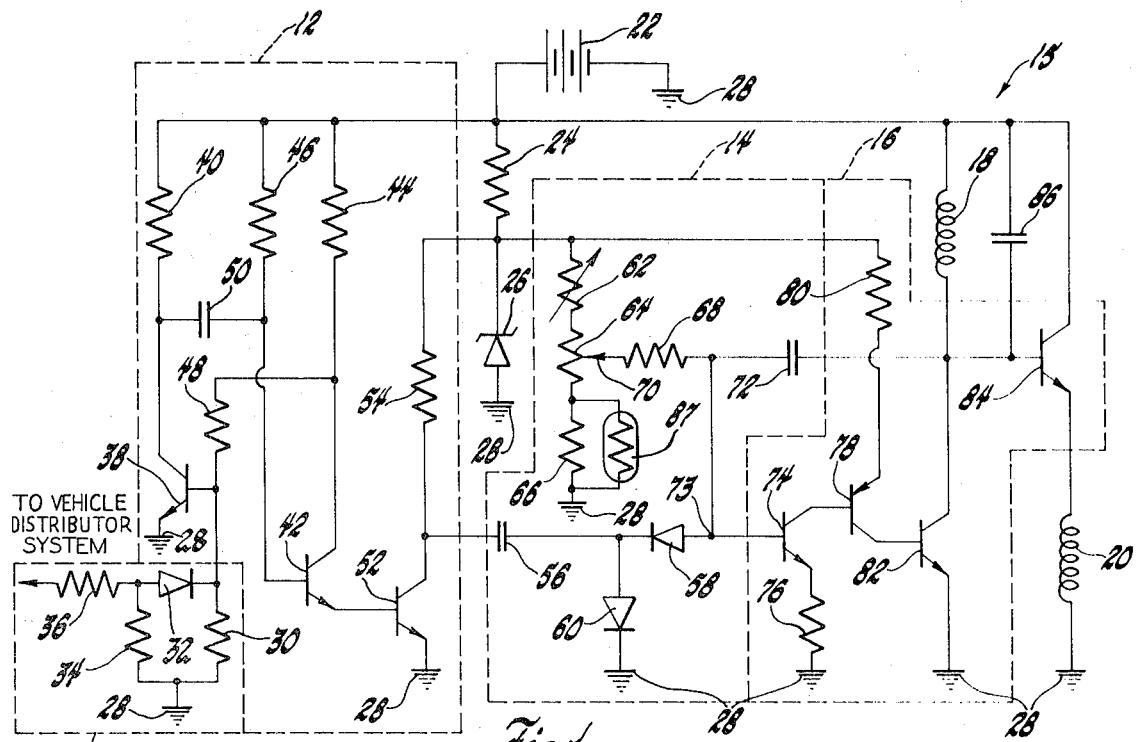
FIG. 1 is a schematic diagram of a circuit for measuring the speed of a vehicle engine incorporating the principles of the invention.

Referring to FIG. 1, an electrical measuring device for measuring the rate of occurrence of an event is comprised of an input circuit 10, a multivibrator 12, a tachometer circuit 14, meter control means 15 including an amplifier 16, a coil winding 18 and a coil winding 20, a source of electric power 22, which may be, for example, a vehicle battery, and a resistor 24 and a Zener diode 26 connected in a parallel relationship with the source of electric power 22 in a manner such that the anode of the Zener diode 26 and the negative terminal of the source of electric power 22 are referenced to a ground 28. The resistor 24 and the Zener diode 26 provide for voltage regulation.

The input circuit 10 includes a resistor 30 connected between the cathode of a diode 32 and the ground 28. A resistor 34 is connected in a parallel relationship with the diode 32 and the resistor 30. A resistor 36 is connected between the anode of the diode 32 and a vehicle distributor system (not shown). The input circuit 10 receives from the vehicle distributor system a series of voltage pulses, the frequency of which corresponds to the speed of the vehicle engine. These voltage pulses generate a series of voltage pulses across the resistor 30 to trigger the multivibrator 12. The input circuit 10 is shown to be receiving a voltage pulse input from a vehicle distributor system to measure the speed of a vehicle engine for illustration purposes only. It is understood that the input to the input circuit 10 may be from any device which generates a series of voltage pulses having a frequency corresponding to the rate of the event which is to be measured.

The multivibrator 12 includes an NPN type transistor 38 having its collector electrode connected to the positive terminal of the source of electric power 22 through a resistor 40 and its emitter electrode connected to the ground 28. An NPN type transistor 42 has its collector electrode connected to the positive terminal of the source of electric power 22 through a resistor 44 and its base electrode connected to the positive terminal of the source of electric power 22 through a resistor 46. The base of the transistor 38 is connected to the cathode of the diode 32 and is connected to the collector electrode of the transistor 42 through a resistor 48. A capacitor 50 is connected between the collector electrode of the transistor 38 and the base electrode of the transistor 42. An NPN type transistor 52 has its collector electrode connected to the cathode of the Zener diode 26 through a resistor 54, its base electrode connected to the emitter electrode of the transistor 42 and its emitter electrode connected to the ground 28.

With no voltage pulse input to the input circuit 10 from the vehicle distributor system, the transistor 38 is nonconducting and the transistors 42 and 52 are conducting. With a voltage pulse input to the input circuit 10 from the vehicle distributor system, the voltage pulse generated across the resistor 30 causes the transistor 38 to conduct. A negative voltage pulse appearing at the base electrode of the transistor 42 resulting from the discharge of the capacitor 50 through the transistor 38 renders the transistors 42 and 52 nonconductive. The capacitor 50 charges through the resistor 46 to a value which renders the transistors 42 and 52 conductive, which in turn render the transistor 38 nonconductive. This cycle is repeated at a frequency corresponding to the frequency of the voltage pulse input to the input circuit 10 from the vehicle distributor system and therefore corresponding to the speed of the vehicle engine.

The tachometer circuit 14 includes a capacitor 56 connected between the collector electrode of the transistor 52 and the cathode of a diode 58. A diode 60 has its anode connected to the cathode of the diode 58 and its cathode connected to the ground 28. A series combination of a variable resistor 62, a potentiometer 64, and a resistor 66 is connected in a parallel relationship with the Zener diode 26 in a manner such that the variable resistor 62 is connected to the cathode of the Zener diode 26 and the resistor 66 is connected to the ground 28. A resistor 68 is connected between a wiper arm 70 of the potentiometer 64 and the anode of the diode 58. A feedback capacitor 72 is connected between the anode of the diode 58 and the amplifier 16 to feedback alternating current components at the output of the amplifier 16. When the transistor 52 is nonconducting, the capacitor 56 charges from the positive terminal of the source of electric power 22 through the resistors 24 and 54 and the diode 60 to the ground 28. When the transistor 52 is conducting, the capacitor 56 discharges through the diode 58 and the collector and emitter electrodes of the transistor 52 to the ground 28. As can be seen, the capacitor 56 charges and discharges with each pulse input to the input circuit 10. Therefore, as the frequency of the voltage pulse input from the vehicle distributor system increases to the input circuit 10, the discharge current of the capacitor 56 results in a decrease in the input signal to the amplifier 16 as taken at a summing junction 73. As can be seen, the input signal to the amplifier 16 as taken from the junction 73 is a direct current signal comprised of the summation of the currents to the junction 73. These currents are comprised of a positive current input to the junction 73 through the variable resistor 62, the potentiometer 64, and the resistor 68, a positive current input through the feedback capacitor 72 from the amplifier 16, and a negative current input resulting from the periodic discharging of the capacitor 56. The variable resistor 62 is utilized to provide an initial adjustment in the gain of the amplifier 16.

The amplifier 16 includes an NPN type transistor 74 having its base electrode connected to the anode of the diode 58 and its emitter electrode connected to the ground 28 through a resistor 76. A PNP type transistor 78 has its base electrode connected to the collector electrode of the transistor 74 and has its emitter electrode connected to the cathode of the Zener diode 26 through a resistor 80. An NPN type transistor 82 has its base electrode connected to the collector electrode of the transistor 78 and has its emitter electrode connected to the ground 28. An NPN type transistor 84 has its base electrode connected to the collector electrode of the transistor 82 and to the feedback capacitor 72, and has its collector electrode connected to the positive terminal of the source of electric power 22. The coil winding 18 is connected between the positive terminal of the source of electric power 22 and the collector electrode of the transistor 82. The coil winding 20 is connected between the emitter electrode of the transistor 84 and the ground 28. A capacitor 86 is connected between the base electrode of the transistor 84 and the positive terminal of the source of electric power 22 to provide for alternating current component filtering.

In order to compensate for drift in the amplifier 16 resulting from changes in temperature, a thermistor 87 is placed in a parallel relationship with the resistor 66. A change in temperature will be sensed by the thermistor 87 to vary the current input to the junction 73 through the variable resistor 62, the potentiometer 64, and the resistor 68 to compensate for drift in the amplifier 16 due to the temperature change.

With no voltage pulse input to the input circuit 10, the electric signal input to the base of the transistor 74 from the tachometer circuit 14 is such that the transistors 74, 78 and 82 are conducting near their saturation points. Therefore, maximum current will flow from the source of electric power 22 through the coil winding 18 and the collector and the emitter electrodes of the transistor 82 to the ground 28. With the transistor 82 conducting near its saturation point, the transistor 84 is biased to a nonconducting state and, therefore, no current will flow through the coil winding 20. As the frequency of the input voltage pulses from the vehicle distributor system to the input circuit 10 increases, the input to the amplifier 16 on the base of the transistor 74 decreases, thereby decreasing the conductivity of the transistor 82 to decrease the current through the coil winding 18. As the conductivity of the transistor 82 decreases, the bias on the base of the transistor 84 increases to render the transistor 84 conductive. Therefore, current will begin to flow from the source of electric power 22 through the collector and emitter electrodes of the transistor 84 and the coil winding 20 to the ground 28. It therefore can be seen that, as the frequency of the voltage pulses from the vehicle distributor system increases, the current through the coil winding 18 decreases and the current through the coil winding 20 increases correspondingly.

Figure 2:
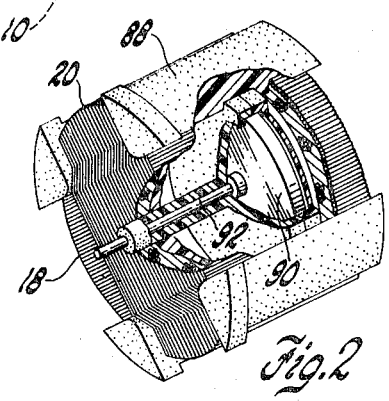
FIG. 2 is a three-quarter view, partly in cross section of a coil winding and armature unit utilized in the invention.

Referring to FIG. 2, the coil winding and armature unit illustrated includes a support means in the form of a bobbin 88 made of a nonmagnetic material, such as plastic. The bobbin 88 is formed so as to accommodate the coil windings 18 and 20 and a permanent armature magnet 90 in the form of a flat round disk which is diametrically magnetized such that the poles are diametrically opposed to one another. The coil windings 18 and 20 are wound on the bobbin 88 such that their magnetic axes intersect at right angles at the common center of the coil windings. The armature 90 is mounted on the bobbin 88 by means of a shaft 92 which extends beyond the intersection of the coil windings 18 and 20.

Figure 3:
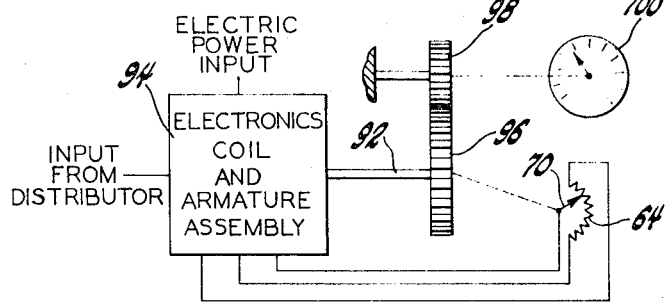
FIG. 3 is a schematic showing the indicator drive and indicator error compensation incorporating the preferred embodiments of the invention.

Referring to FIG. 3, a block 94 represents the electronics, coil windings and permanent magnet armature assembly as shown in FIGS. 1 and 2, and is shown to be receiving an input from the vehicle distributor system and an input from an electric power source. The shaft 92 from the permanent magnet armature 90 in FIG. 2 is connected to a gear 96. As the shaft 92 rotates, the gear 96 is rotated thereby to drive a gear 98. An indicator 100 is effectively connected to the gear 98 to be rotated thereby and is suitably calibrated to indicate vehicle engine speed. The respective diameters of the gears 96 and 98 are such that a specific arcual movement of the gear 96 will produce a greater arcual movement of the gear 98 and the indicator 100. Thus, the gears 96 and 98 provide means for driving the indicator over a wide angle.

In order that a relatively inexpensive coil winding and armature unit may be utilized and yet obtain a high accuracy indication, a compensation network including the potentiometer 64 of FIGS. 1 and 3 is utilized. The wiper arm 70 of the potentiometer 64 is suitably secured to the gear 96 for rotation therewith. As the gear 96 is rotated, the wiper arm 70 is rotated to vary the current input to the summing junction 73 to compensate for known nonlinearities of the coil winding and armature unit. This type of compensation network which is a form of a position feedback network has the inherent quality of producing a high torque output of the meter control means 15 to enable the coil winding and armature unit to drive the indicator 100 through the gears 96 and 98 to obtain a wide angle indication. In addition, this type of compensation eliminates the requirement of close tolerances in the circuit of the amplifier 16, since the accuracy of the position of the indicator 100 is primarily determined by the potentiometer 64. This compensation network in addition to the temperature compensation by the thermistor 87 provides for a highly accurate indication by utilizing a relatively inexpensive coil winding and armature unit.

Figure 4:
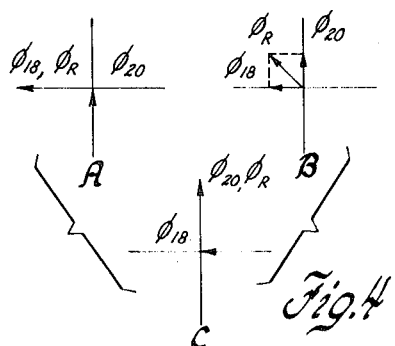
FIG. 4 is a group of flux vector diagrams illustrating the operation of the specific embodiments.

Describing the operation of the electrical measuring device as shown in FIGS. 1, 2 and 3, reference should be had to the flux vector diagrams of FIG. 4. With no voltage pulse input from the vehicle distributor system to the input circuit 10, maximum current is flowing to the coil winding 18 and no current is flowing to the coil winding 20. Therefore, as shown in FIG. 4A, the coil winding 18 will produce a relatively large magnetic field component $\Phi_{18}$ which extends in a westerly direction as shown and the coil winding 20 will produce a zero magnetic field. The resultant magnetic field $\Phi_R$ as determined by vector addition is aligned with the magnetic field component $\Phi_{18}$. As the input circuit 10 receives a series of voltage pulses from the vehicle distributor system, the current through the coil winding 18 decreases and the current through the coil winding 20 increases as previously described. As shown in FIG. 4B, the coil winding 18 therefore produces a magnetic field component $\Phi_{18}$ of a lesser magnitude in the westerly direction and the coil winding 20 produces a magnetic field component $\Phi_{20}$ in a northerly direction. The resultant magnetic field $\Phi_R$ as determined by vector addition is aligned in a northwest direction as shown. As the series of voltage pulses from the vehicle distributor system to the input circuit 10 increases to a maximum frequency, the current through the coil winding 18 decreases to a zero value while the current through the coil winding 20 increases to a maximum value. Therefore, as shown in FIG. 4C, the coil winding 18 produces a zero magnetic field and the coil winding 20 produces a relatively large magnetic field component $\Phi_{20}$ along a northerly direction. The resultant magnetic field $\Phi_R$ as determined by vector addition is aligned with the magnetic field component $\Phi_{20}$. The permanent magnet armature 90, being jointly influenced by the magnetic field components $\Phi_{18}$ and $\Phi_{20}'$ aligns with the resultant flux vector $\Phi_R$. Therefore, as can be seen from FIG. 4, the magnetic armature 90 will rotate 90° from a position in a westerly direction, as shown in FIG. 4A, to a position in a northerly direction as represented by FIG. 4C. As the magnetic armature rotates, the shaft 92 and the gears 96 and 98 and the indicator 100 are rotated thereby to provide an indication of the vehicle engine speed. In addition, the wiper 70 is rotated to vary the resistance of the potentiometer 64 to compensate for known nonlinearities introduced by the coil winding and armature unit of FIG. 2.

While the above description of the present invention has been directed toward a specific embodiment thereof in the form of a device to measure the speed of a vehicle engine, it will be obvious to those skilled in the art that this invention may be readily adapted to other uses, including speedometer and frequency measuring applications.

Figure 5:
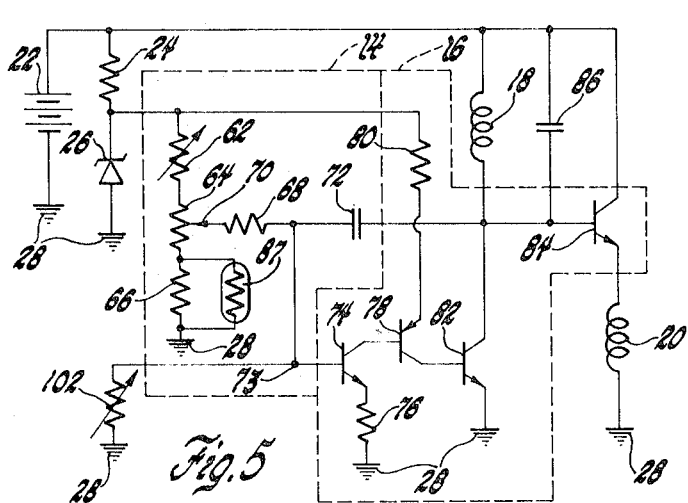
FIG. 5 is a schematic diagram of a circuit for measuring the fuel level of a vehicle incorporating the principles of the invention.

Referring to FIG. 5, another embodiment of the invention is shown in which a condition at a remote point such as vehicle fuel level is measured. In this embodiment, the input circuit 10, the multivibrator 12, and the capacitor 56 and the diodes 58 and 60 of FIG. 1 are eliminated. A variable resistor 102 is connected between the base of the transistor 74 and the ground 28. The resistance of the variable resistor 102 is controlled in a manner such that an increase in the magnitude of the condition to be measured such as fuel level decreases the resistance of the variable resistor 102 so as to decrease the summation of the current input to the summing junction 73 with the result of a decrease in input to the amplifier 16. In all other respects, the operation of the electrical measuring device is identical to the operation as described in the previous embodiment.

What has been described is an electrical measuring device for measuring conditions such as the rate of occurrence of an event or the magnitude of same quantity at a remote point in which a relatively inexpensive gauge mechanism is driven to produce a high accuracy indication of the condition being measured.

What is claimed is:

1. An electrical measuring device including means responsive to a condition to be measured for generating an electric output having a magnitude dependent upon the magnitude of the condition to be measured, meter control means connected so as to receive the electric output and to produce a resultant magnetic field the angular displacement of which corresponds to the magnitude of the condition to be measured, permanent magnet armature means responsive to the resultant magnetic field so as to align itself therewith, indicator means positionable by the armature means and suitably calibrated so as to indicate the magnitude of the condition to be measured, and error compensation means connected to the armature means so as to be responsive to the position of the armature means and connected to the means responsive to the said condition for varying the electric output of the means responsive to the condition to be measured to compensate for known nonlinearities in the meter control means and in the response to the resultant magnetic field by the armature means.

2. The electrical measuring device in Claim 1, wherein the error compensation means includes a potentiometer electrically connected to the means responsive to a condition to be measured and having a wiper arm effectively connected to the permanent magnet armature so as to be rotated thereby.

3. An electrical measuring device including means responsive to a condition to be measured for generating an electric output having a magnitude dependent upon the magnitude of the condition to be measured; meter control means connected so as to receive the electric output of the means responsive to a condition to be measured and to produce a resultant magnetic field the angular displacement of which corresponds to the magnitude of the condition to be measured, the meter control means including first and second coil means for producing first and second magnetic field components along first and second axes respectively, a source of electric power for supplying current to the first and second coil means, first current control means responding to the electric output of the means responsive to a condition to be measured and controlling current through the first coil means in a manner such that the magnitude of the first magnetic field component decreases with an increase in the magnitude of the condition to be measured, and second current control means responding to the control of the current through the first coil means and controlling the current through the second coil means in a manner such that the magnitude of the second magnetic field component increases with a decrease in the magnitude of the first magnetic field component so as to produce a change in the angular displacement of the resultant magnetic field so as to correspond to the magnitude of the condition to be measured; permanent magnet armature means responsive to the resultant magnetic field so as to align itself therewith; indicator means positionable by the permanent magnet armature means and suitably calibrated so as to indicate the magnitude of the condition to be measured; and error compensation means including a potentiometer having a resistance portion connected to the means responsive to the condition to be measured and having a wiper arm effectively connected to the permanent magnet armature so as to be rotated thereby so as to vary the electric output of the means responsive to a condition to be measured to compensate for known nonlinearities in the meter control means and in the response to the resultant magnetic field by the permanent magnet armature.

4. The electrical measuring device in Claim 3 wherein the first and second axes are at right angles.

5. An electrical measuring device for indicating the rate of occurrence of an event including means producing a series of voltage pulses the frequency of which corresponds to the rate of occurrence of the event, tachometer means for generating an electric output having a magnitude dependent upon the frequency of the series of voltage pulses, meter control means connected so as to receive the electric output and to produce a resultant magnetic field the angular displacement of which corresponds to the rate of occurrence of the event, permanent magnet armature means responsive to the resultant magnetic field so as to align itself therewith, indicator means positionable by the permanent magnet armature means and suitably calibrated so as to indicate the rate of occurrence of the event and error compensation means connected to the armature means so as to be responsive to the position of the armature means and connected to the tachometer means for varying the electric output of the tachometer means to compensate for known nonlinearities in the meter control means and the response to the resultant magnetic field by the permanent armature.